US 12,441,387 B1

(12) United States Patent
Neifert et al.

(10) Patent No.: US 12,441,387 B1
(45) Date of Patent: Oct. 14, 2025

(54) RAKE ADJUSTMENT ASSEMBLY FOR VEHICLE STEERING SYSTEM

(71) Applicant: Steering Solutions IP Holding Corporation, Saginaw, MI (US)

(72) Inventors: Jimm J. Neifert, Grand Blanc, MI (US); Zachery P. Schultz, Munger, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/830,120

(22) Filed: Sep. 10, 2024

(51) Int. Cl.
*B62D 1/181* (2006.01)
*B62D 1/185* (2006.01)

(52) U.S. Cl.
CPC .............. *B62D 1/181* (2013.01); *B62D 1/185* (2013.01)

(58) Field of Classification Search
CPC ....................................................... B62D 1/181
See application file for complete search history.

(56) References Cited

U.S. PATENT DOCUMENTS

| | | | | | |
|---|---|---|---|---|---|
| 10,279,834 | B2* | 5/2019 | Stinebring | ............. | B62D 1/181 |
| 10,464,592 | B2* | 11/2019 | Messing | ................. | F16H 25/20 |
| 10,800,442 | B2* | 10/2020 | Ishimura | ................. | B62D 1/185 |
| 11,305,807 | B2* | 4/2022 | McClelland | ........... | B62D 1/195 |
| 12,151,738 | B2* | 11/2024 | Taguchi | ................. | B62D 1/181 |
| 2006/0266151 | A1* | 11/2006 | Avers | ..................... | B62D 1/181 |
| | | | | | 74/492 |
| 2015/0232117 | A1* | 8/2015 | Stinebring | ............. | B62D 1/181 |
| | | | | | 74/493 |
| 2016/0046318 | A1* | 2/2016 | Stinebring | ............. | B62D 1/181 |
| | | | | | 74/493 |
| 2016/0252133 | A1* | 9/2016 | Caverly | ................. | B62D 1/185 |
| | | | | | 74/493 |
| 2017/0174249 | A1* | 6/2017 | Stinebring | ............. | B62D 1/181 |
| 2018/0099687 | A1* | 4/2018 | Stinebring | ............. | B62D 1/195 |
| 2019/0300042 | A1* | 10/2019 | Derocher | ............... | B62D 1/185 |
| 2020/0172144 | A1* | 6/2020 | Derocher | ............... | B62D 1/183 |
| 2021/0024121 | A1* | 1/2021 | Matsuno | ................. | B62D 1/195 |
| 2021/0129895 | A1* | 5/2021 | Ryne | ....................... | F16H 53/06 |
| 2021/0347404 | A1* | 11/2021 | Beach | .................... | B62D 1/187 |
| 2023/0331283 | A1* | 10/2023 | Caverly | ................. | B62D 5/006 |

FOREIGN PATENT DOCUMENTS

| | | | | | |
|---|---|---|---|---|---|
| CN | 115103792 | A * | 9/2022 | ............. | B62D 1/18 |
| DE | 102019201621 | A1 * | 8/2020 | ............. | B62D 1/181 |
| DE | 102014104362 | B4 * | 2/2021 | ............. | B62D 1/181 |
| DE | 102020129086 | A1 * | 5/2021 | ............. | B62D 1/181 |
| DE | 102023109325 | A1 * | 10/2023 | ............. | B62D 1/181 |
| EP | 4360994 | A1 * | 5/2024 | ............. | B62D 1/181 |
| WO | WO-2006128065 | A2 * | 11/2006 | ............. | B62D 1/181 |
| WO | WO-2017139627 | A1 * | 8/2017 | ............. | B62D 1/181 |
| WO | WO-2022045346 | A1 * | 3/2022 | ............. | B62D 1/181 |

* cited by examiner

*Primary Examiner* — Nicole T Verley
(74) *Attorney, Agent, or Firm* — Dickinson Wright PLLC

(57) ABSTRACT

A rake actuator assembly for a steering column includes a jacket extending longitudinally about a central axis. The rake actuator assembly also includes a rake actuator operatively coupled to the jacket. The rake actuator assembly further includes a leadscrew rotatably driven by the rake actuator. The rake actuator assembly yet further includes a nut threadably coupled to the leadscrew. The rake actuator assembly also includes a nut capture bracket operatively coupled to a first side of the nut and a second, opposite side of the nut.

14 Claims, 3 Drawing Sheets

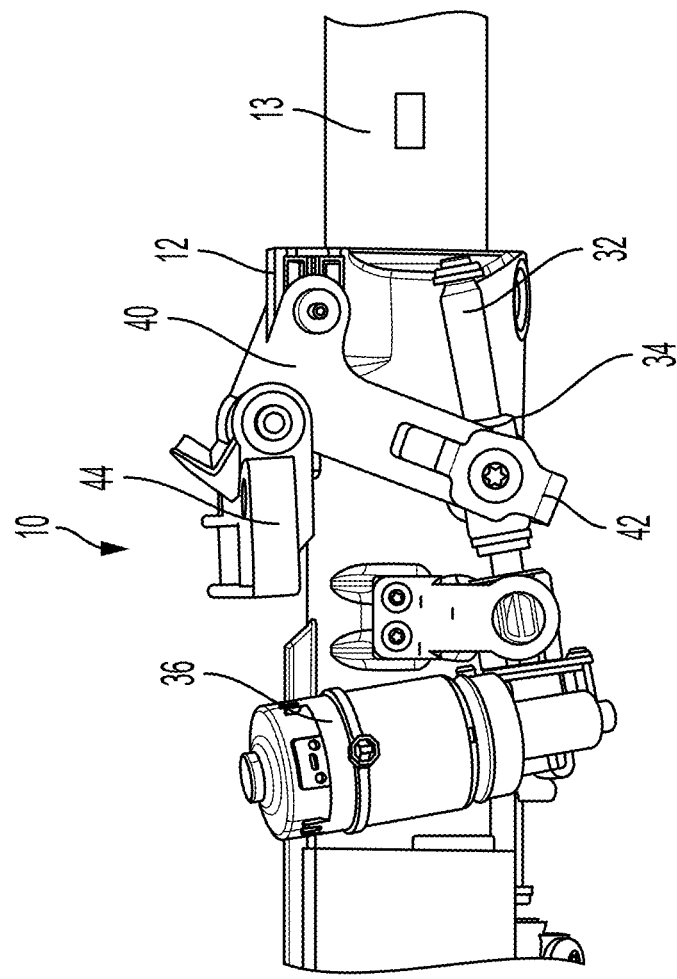
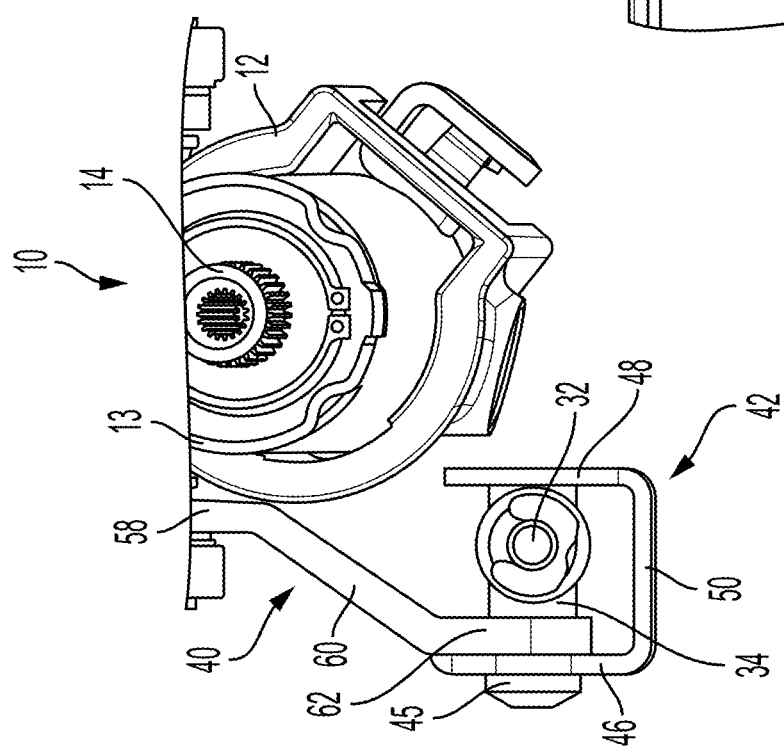
FIG. 3
FIG. 2

RAKE ADJUSTMENT ASSEMBLY FOR VEHICLE STEERING SYSTEM

FIELD OF THE INVENTION

The embodiments described herein relate to vehicle steering systems and, more particularly, to a rake adjustment assembly for vehicle steering systems.

BACKGROUND

A steering column assembly of a vehicle may be adjustable in a rake (substantially vertical) direction. Each of these adjustments may be carried out with respective power assemblies or mechanisms. In one example of such a system, a nut travels along a lead screw to convert its motion to rake adjustment of the steering column. A nut capture bracket and rake bracket assembly are components in rake adjustment assemblies, but the dimensions, geometry and kinematics of these components typically limit how close the rake actuator can be to the steering column centerline, thereby adversely affecting packaging capabilities.

SUMMARY

According to one aspect of the disclosure, a rake actuator assembly for a steering column includes a jacket extending longitudinally about a central axis. The rake actuator assembly also includes a rake actuator operatively coupled to the jacket. The rake actuator assembly further includes a leadscrew rotatably driven by the rake actuator. The rake actuator assembly yet further includes a nut threadably coupled to the leadscrew. The rake actuator assembly also includes a nut capture bracket operatively coupled to a first side of the nut and a second, opposite side of the nut.

According to another aspect of the disclosure, a rake actuator assembly for a steering column includes a jacket extending longitudinally about a central axis. The rake actuator assembly also includes a rake actuator operatively coupled to the jacket. The rake actuator assembly further includes a leadscrew rotatably driven by the rake actuator. The rake actuator assembly yet further includes a nut threadably coupled to the leadscrew, wherein the nut includes a first side and a second side, the second side being closer to the central axis of the jacket and the first side being distal from the central axis of the jacket. The rake actuator assembly also includes a rake bracket operatively coupled to the nut on the first side of the nut.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is an end view of a portion of the steering column assembly.

FIG. 3 is a side, elevation view of the steering column assembly.

DETAILED DESCRIPTION

Referring now to the Figures, where the invention will be described with reference to specific embodiments, without limiting same, illustrated are embodiments of a rake adjustment assembly of a steering column with a low profile rake bracket and nut capture bracket.

Figure 1:
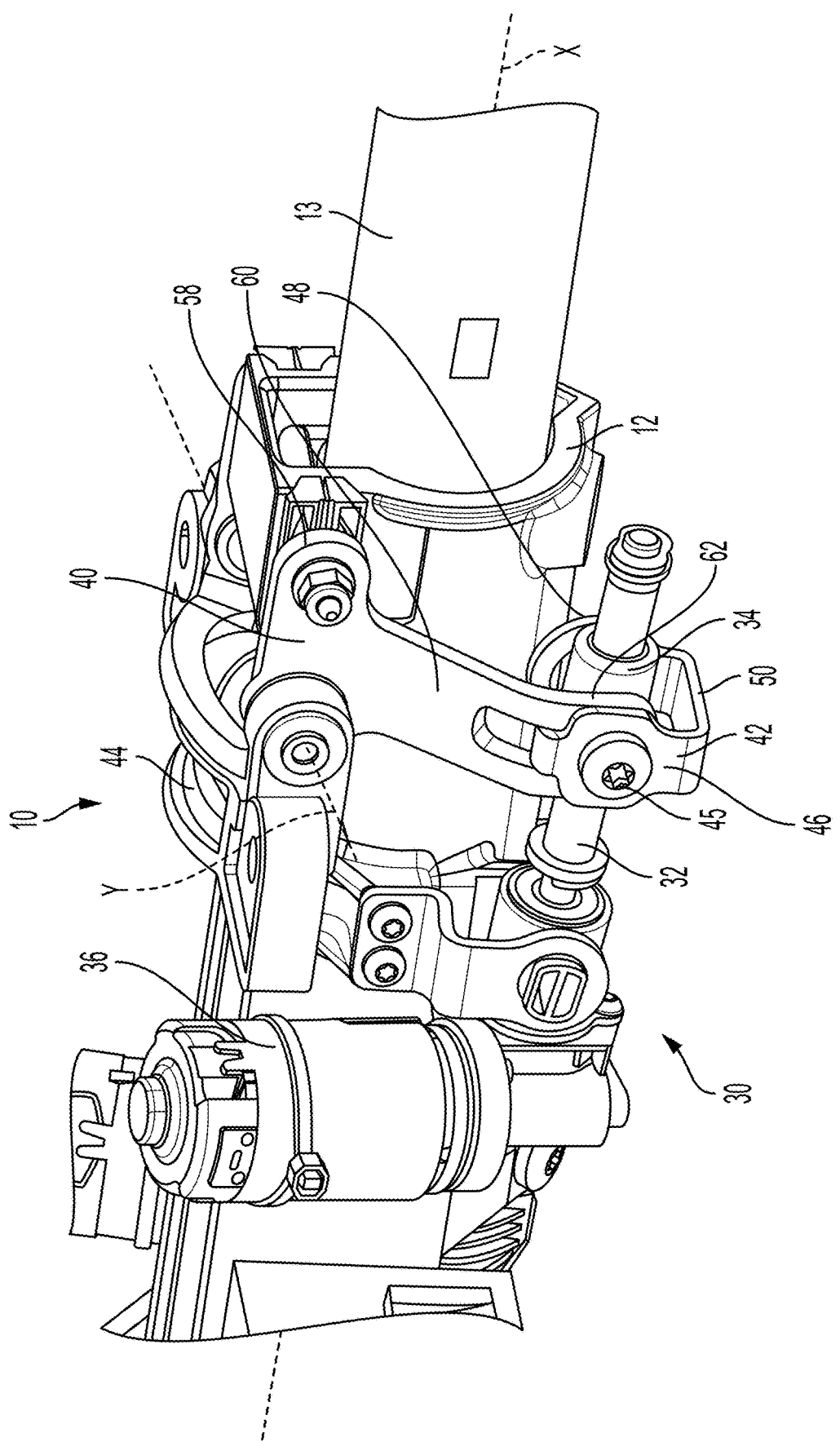
FIG. 1 is a perspective view of a portion of steering column assembly.

FIG. 1 illustrates a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X). In the embodiments disclosed herein, the steering column assembly 10 is adjustable in a rake direction, which pivots at least a portion of the steering column assembly 10 to allow an operator to adjust the vertical position of the steering column assembly 10. The steering column assembly 10 includes a lower jacket 12, an upper jacket 13, and a steering shaft 14 (FIGS. 2 and 4) extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13. The upper jacket 13 has a portion extending into the lower jacket 12 and is translatable therein.

Referring now to FIGS. 1-3, a rake adjustment assembly 30 is illustrated. The rake adjustment assembly 30 facilitates electromechanical powered rake adjustments of the lower jacket 12, the upper jacket 13 and the steering shaft 14 by pivoting the components collectively about a pivot axis (not shown). The rake adjustment assembly 30 includes a leadscrew 32 having a nut 34 threaded thereto. A motor 36 rotatably drives the leadscrew 32 to translate the nut 34 therealong. The nut 34 is operatively coupled to the jacket components of the steering column assembly 10 via a rake bracket 40, such that linear movement of the nut 34 along the leadscrew 32 drives the column components to and from different rake positions. In particular, the rake bracket 40 is driven to pivot about an axis Y, which is based on a connection between the rake bracket 40 and a mounting bracket 44. The mounting bracket 44 is stationary and mounts the steering column assembly 10 to the vehicle structure.

The nut 34 is a jackscrew nut in some embodiments. Regardless of the specific type of nut employed, the nut 34 is directly fastened to a nut capture bracket 42. The nut capture bracket 42 is operatively coupled to the rake bracket 40, and the rake bracket 40 is coupled to the lower jacket 12, however it is contemplated that the rake bracket 40 may be coupled to the upper jacket 13 in some embodiments.

Figure 4:
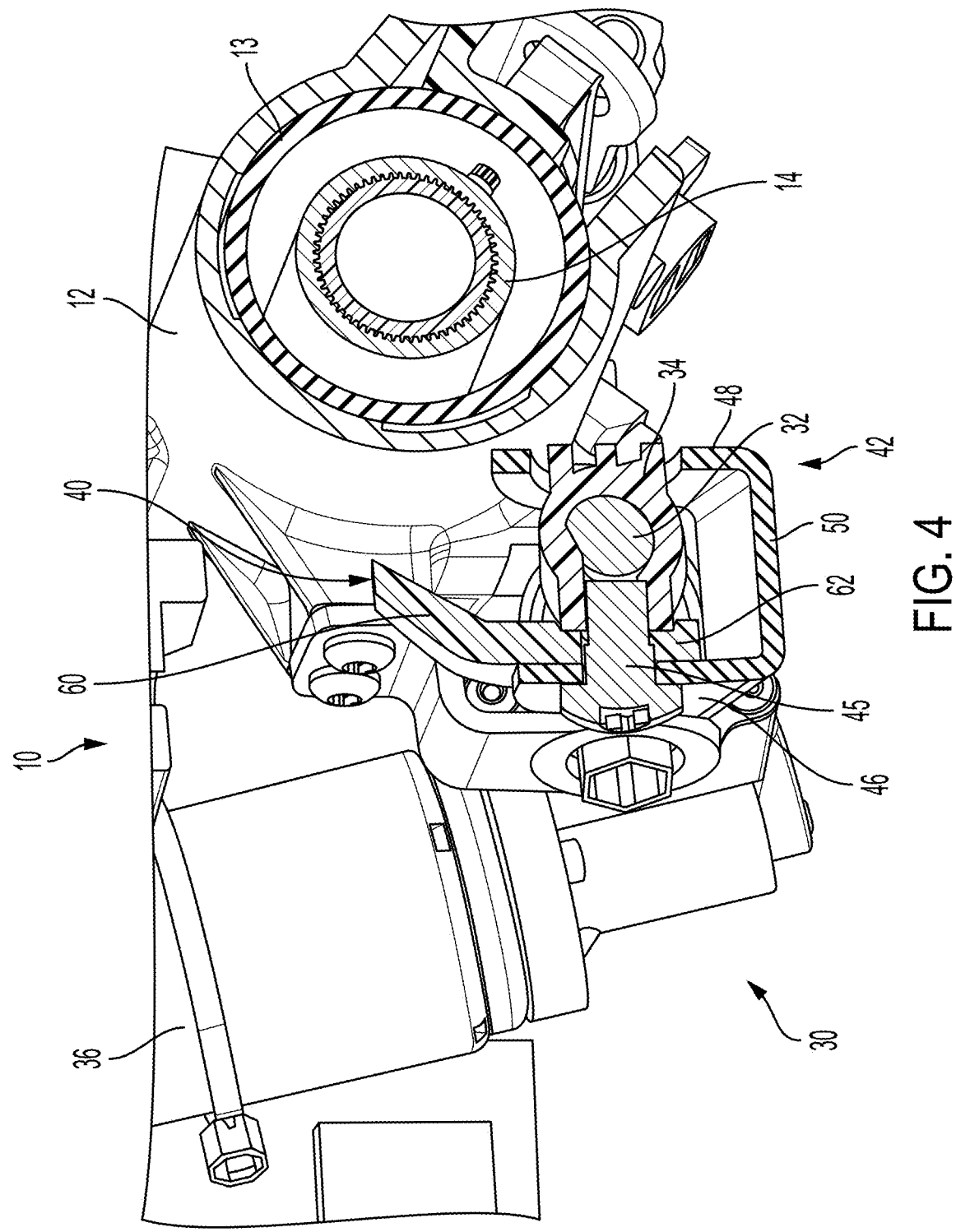
FIG. 4 is a perspective view of a portion of a rake adjustment assembly.

Referring to FIG. 4, the nut capture bracket 42 has a substantially U-shaped geometry in some embodiments. The nut capture bracket 42 includes a first side wall 46, a second side wall 48 and a base wall 50. The base wall 50 connects the first side wall 46 and the second side wall 48. The first side wall 46 is on a radially outer side—relative to axis X—of the rake bracket 40. The second side wall 48 is on a radially inner side—relative to axis X—of the rake bracket 40. As shown in the illustrated embodiment, the nut 34 is directly coupled to the nut capture bracket 42 with a single mechanical fastener 45, such as a bolt or the like. In particular, the mechanical fastener 45 extends through an aperture of the first side wall 46 of the nut capture bracket 42, through an aperture of the rake bracket 40, and into a threaded opening of the nut 34 to secure the nut 34, the rake bracket 40 and the nut capture bracket 42 together. This connection only requires a single fastener to make the above-described connection, which is a reduction in part count and assembly complexity compared to prior rake actuator assemblies.

FIGS. 1, 2 and 4 clearly illustrate the rake bracket 40 operatively coupled to a portion of the nut 34—via the nut capture bracket 42—which is radially outward relative to the axis X, which represents a centerline of the steering column assembly 10. In other words, the rake bracket 40 has a first coupling portion 58 for coupling to the lower jacket 12 and an angled portion 60 extending from the first coupling portion 58 to a second coupling portion 62. The second coupling portion 62 couples to the nut capture bracket 42 and the nut 34. The angled portion 60 allows coupling to the first side wall 46 of the nut capture bracket 42, rather than a radially inner side of the nut 34. This mounting arrangement and rake bracket 40 geometry allows the motor 36 and centerline of the leadscrew 32 to be moved radially inward relative to the axis X. Even minor shifts inward provide packaging advantages, mass concentration benefits and NVH optimization.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rake actuator assembly for a steering column comprising:
    a jacket extending longitudinally about a central axis;
    a rake actuator operatively coupled to the jacket;
    a leadscrew rotatably driven by the rake actuator;
    a nut threadably coupled to the leadscrew;
    a nut capture bracket operatively coupled to a first side of the nut and a second, opposite side of the nut; and
    a rake bracket operatively coupled to the nut capture bracket and the nut with a single mechanical fastener, wherein the single mechanical fastener extends through an aperture of the first side wall of the nut capture bracket and through an aperture of the rake bracket.

2. The rake actuator assembly of claim 1, wherein the nut capture bracket includes a first side wall, a second side wall, and a base wall connecting the first side wall and the second side wall.

3. The rake actuator assembly of claim 2, wherein the nut capture bracket is U-shaped.

4. The rake actuator assembly of claim 2, wherein the second side of the nut is closer to the central axis of the jacket and the first side of the nut is distal from the central axis of the jacket.

5. The rake actuator assembly of claim 4, wherein the first side wall is positioned radially outward of the first side of the nut, the second side wall positioned radially inward of the second side of the nut.

6. The rake actuator assembly of claim 1, wherein the single mechanical fastener extends into threaded engagement with a threaded opening of the nut.

7. A rake actuator assembly for a steering column comprising:
    a jacket extending longitudinally about a central axis;
    a rake actuator operatively coupled to the jacket;
    a leadscrew rotatably driven by the rake actuator;
    a nut threadably coupled to the leadscrew, wherein the nut includes a first side and a second side, the second side being closer to the central axis of the jacket and the first side being distal from the central axis of the jacket; and
    a rake bracket operatively coupled to the nut on the first side of the nut, wherein the rake bracket pivots about an axis which is perpendicular to the central axis of the jacket.

8. The rake actuator assembly of claim 7, wherein the nut capture bracket is operatively coupled to the first side of the nut.

9. The rake actuator assembly of claim 7, wherein the nut capture bracket includes a first side wall, a second side wall, and a base wall connecting the first side wall and the second side wall.

10. The rake actuator assembly of claim 9, wherein the nut capture bracket is U-shaped.

11. The rake actuator assembly of claim 9, wherein the first side wall is positioned radially outward of the first side of the nut, the second side wall positioned radially inward of the second side of the nut.

12. A rake actuator assembly for a steering column comprising:
    a jacket extending longitudinally about a central axis;
    a rake actuator operatively coupled to the jacket;
    a leadscrew rotatably driven by the rake actuator;
    a nut threadably coupled to the leadscrew, wherein the nut includes a first side and a second side, the second side being closer to the central axis of the jacket and the first side being distal from the central axis of the jacket; and
    a rake bracket operatively coupled to the nut on the first side of the nut, wherein the rake bracket is operatively coupled to the nut capture bracket and the nut with a single mechanical fastener, wherein the single mechanical fastener extends through an aperture of the first side wall of the nut capture bracket and through an aperture of the rake bracket.

13. The rake actuator assembly of claim 12, wherein the single mechanical fastener extends into threaded engagement with a threaded opening of the nut.

14. A rake actuator assembly for a steering column comprising:
    a jacket extending longitudinally about a central axis;
    a rake actuator operatively coupled to the jacket;
    a leadscrew rotatably driven by the rake actuator;
    a nut threadably coupled to the leadscrew;
    a nut capture bracket operatively coupled to a first side of the nut and a second, opposite side of the nut; and
    a rake bracket operatively coupled to the nut capture bracket and the nut with a single mechanical fastener, wherein the rake bracket pivots about an axis which is perpendicular to the central axis of the jacket.

* * * * *